Oct. 5, 1937.  A. W. BULL  2,094,636
TIRE
Filed Nov. 24, 1934  2 Sheets-Sheet 1
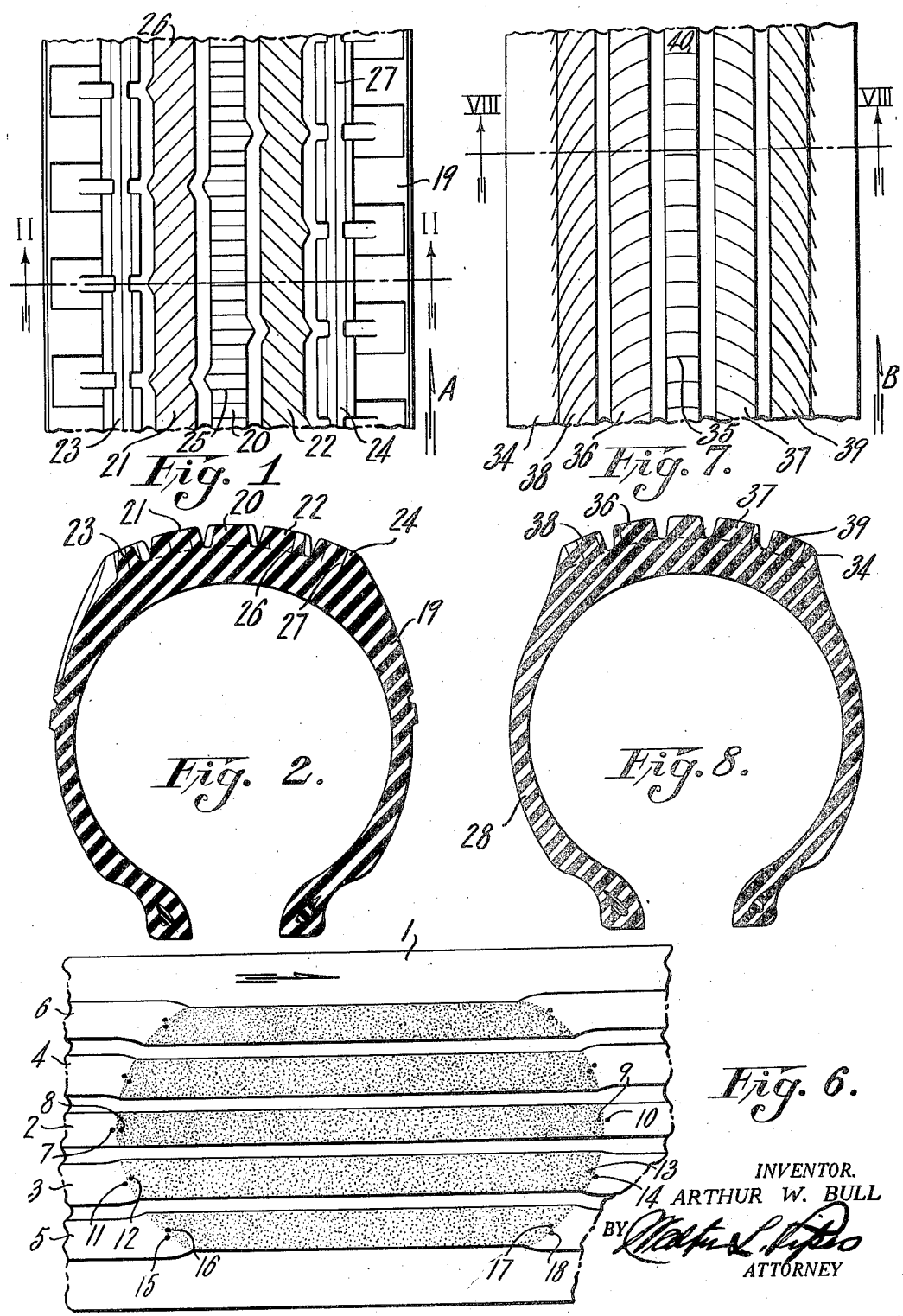

Oct. 5, 1937.  A. W. BULL  2,094,636
TIRE
Filed Nov. 24, 1934  2 Sheets-Sheet 2
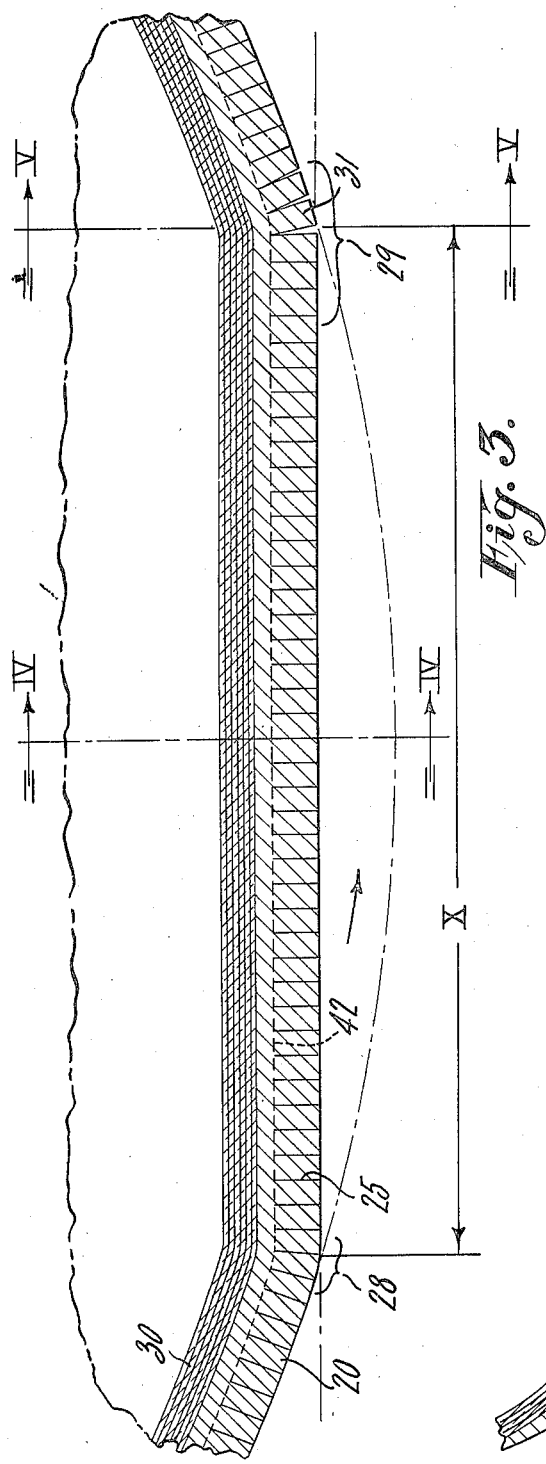
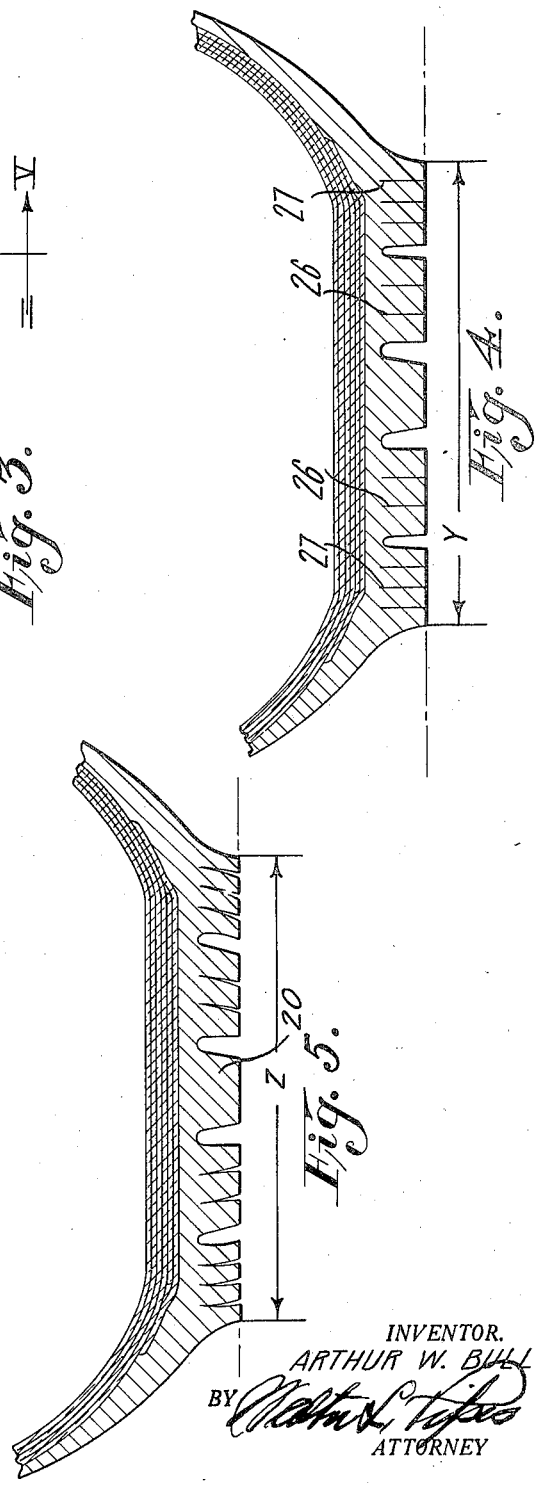
INVENTOR.
ARTHUR W. BULL
BY
ATTORNEY Patented Oct. 5, 1937

2,094,636

UNITED STATES PATENT OFFICE 2,094,636

TIRE

Arthur W. Bull, Grosse Pointe, Mich., assignor to United States Rubber Company, New York, N. Y., a corporation of New Jersey Application November 24, 1934, Serial No. 754,608

6 Claims. (Cl. 152—14)

My invention relates to improvements in tire treads, and more particularly to improvements in the treads for pneumatic tires.

It has been established that the wearing of tire treads occurs in large part in the area of the tread which is just engaging the road surface and in the area which is just leaving the road surface.

Laboratory and road tests have shown that the rubber just engaging the road surface undergoes a distinct movement which is different from the general movement of rotation. At the leading road surface engaging edge and at the centre of the tire this movement in general is in the direction of revolution of the tire, or is a movement circumferentially ahead of the tire. In the central area of the tire which is just leaving the road the movement is more pronouncedly in a circumferentially forward direction. At the sides or shoulder portions of the tread this movement of engagement and disengagement is substantially crosswise of the tire. The rubber in the intermediate tread areas moves in directions intermediate between the forward movement of the centre of the tire and the lateral movement at the shoulders. Also the width of the tread surface in engagement with the road surface is narrower than it is when not in engagement with the road surface.

Because of these local movements of the rubber during the periods of tread engagement and disengagement there is a slipping or scuffing of the rubber in the areas of engagement and disengagement which causes abrasion of the tread surface.

I propose to remedy this difficulty by superposing upon the normal tread configurations, whether ribs, grooves, antiskid projections, and/or combinations thereof, a series of relatively closely spaced slits, such, for example as may be made by cutting with a knife after the tire is vulcanized, which increase the flexibility of the tread rubber. The depths of these slits may be the same as the depth of the grooves between antiskid configurations or may be slightly deeper, but not deep enough to expose the carcass and/or breaker fabric. By so increasing the flexibility of the tread rubber the amount of slippage or scuffing during engagement and disengagement with the road surface is reduced because the flexibility of the rubber permits local bending in lieu of direct slippage. Stated in another way, the presence of slits breaks up the pulling strains within the local areas of the rubber since the slits will open up as they engage or break away from the ground thereby allowing the tread rubber to adjust itself to the strains set up during the period of adapting the tread rubber to the load or during the period when the tread is being relieved of the load.

The accompanying drawings illustrate certain present preferred embodiments of the invention, in which:

Fig. 1 is a plan view of the portion of a tire embodying my invention;

Fig. 2 is a cross-sectional view thereof taken along the section line II—II of Fig. 1;

Fig. 3 is an enlarged longitudinal view of the central portion of the tire during engagement with a road surface;

Fig. 4 is an enlarged cross-sectional view of a tire along the section line IV—IV of Fig. 3;

Fig. 5 is a cross-sectional view of the tire taken along the section line V—V of Fig. 3 or at the breaking edge;

Fig. 6 is a diagrammatical view illustrating the action of the road engaging surface of the tire;

Fig. 7 is a view similar to Fig. 1 of a modified form of my invention; and

Fig. 8 is a cross-sectional view of the tire shown in Fig. 7 taken on the section line VIII—VIII of Fig. 7.

Referring to Fig. 6, there is shown a pneumatic tire 1 having a rubber tread which is characterized by a central circumferential rib 2, parallel intermediate ribs 3 and 4 and outer or shoulder ribs 5 and 6. These ribs are separated by conventional grooves. When such a tire assumes a load, the tread in engaging with the ground occupies a space as shown by the dotted or shaded area in the diagrammatic view Fig. 6. Such a tread impression can be obtained by placing a heavy glass plate in contact with the tire and causing relative movements therebetween. In such tests the tire is given normal inflation and subjected to normal load. The arrow in Fig. 6 represents the normal circumferential direction of rotation of the tire so that the portions of the tread at the left-hand side of the figure first engage the road or supporting surface and the portions at the right-hand side of the figure indicate the portions which are leaving contact with the supporting surface. The narrowing of the tire at the centre of the supporting area is distinctly noticeable.

In the areas of the tire engaging and breaking away from the supporting surfaces there are local movements which are distinct from the rotational movement of the tire. The movement in the areas immediately adjacent to the area of contact are in general more pronounced than those in the areas of engagement.

Referring to the central rib 2 (Fig. 6), a point 7 on the rubber upon contacting the road surface tends to move circumferentially ahead to a point 8 thus indicating a longitudinal tread movement effected by a compression of the rubber at this point. At the trailing or breaking-away end of the rib 2 the movement is such that a point 9 tends to move to a point 10. While the direction and amount of movement of the points 7 and 9 will vary somewhat in amount and possibly in direction under different load conditions, nevertheless there is a distinct circumferential forward movement of the rubber in the rib 2 at the time of engagement and disengagement at the supporting surface. This results in slipping or scuffing and abrasion of rubber in these areas.

On the ribs 3 and 4 a similar tread movement takes place except that the movement is on a diagonal line relative to the movement of rubber in the rib 2. As the leading ground contacting rubber of the rib 3 at the point 11 engages the supporting surface, it tends to move diagonally to a point 12 with resultant abrasion. In the breaking area on the ribs 3 and 4 the compression is released and the movement is such that the point 13 on the rib 3 tends to move to the point 14. On rib 4 the movements are similar to those on rib 3, except that they are at substantially right angles to those on rib 3. In the outer rib 5 the movement is substantially at right angles to the movements in the rib 2 or crosswise of the tread. In the leading area a point 15 moves to a position 16. On breaking of a contact a point 17 moves to a point 18. In the rib 6 a corresponding outward movement crosswise of the tire is obtained, except that it is opposite in direction.

Accordingly, the frictional movement of the tire tread with respect to the ground takes place mainly at the ground engaging or breaking areas of the tire and little movement of the tread takes place throughout the main ground contacting area. This frictional movement at the engaging and breaking edges of the ground contacting area of the tire results in abrasion at these points and it is an important factor in wearing down tire treads.

By providing the tread rubber with closely spaced slots the stability of the tread rubber in these areas is decreased and, instead of there being a sliding movement of the rubber relative to the ground, the rubber of the tread configurations is permitted a slight bending movement so that the sliding action is materially reduced. The bending movement is relatively slight and is not materially noticeable at the surface of the tire.

In Figs. 1 to 5, inclusive, there is shown a pneumatic tire 19 having a tread of conventional configurations including a central rib 20, intermediate ribs 21 and 22, and shoulder rows of antiskid elements 23 and 24 corresponding to the central rib 2, intermediate ribs 3 and 4, and the outer ribs 5 and 6 of the diagrammatically shown tire in Fig. 6. The central rib 20 is provided with slits 25 extending crosswise of the rib at right angles to the direction of movement of the local areas in the rubber as shown diagrammatically in Fig. 6. The rib 21 is provided with slits 26 extending diagonally of the tread. The rib 22 is likewise provided with diagonally extending slits at right angles to the slits 26 in rib 21. The ribs 23 and 24 are provided with longitudinally extending slits 27. Suitable proportioning for the slits 25 is entirely across the central rib 20 at a depth about equal to the depths of the grooves on either side of the rib and spaced from $\tfrac{3}{16}$ to $\tfrac{5}{16}$ inch apart. If desirable, the slits may extend below the depth of the tread grooves, but they should not expose the underlying breaker or carcass fabric, as is shown in more detail in Fig. 3.

In Fig. 3 the leading ground engaging portion of the tire is indicated by the reference numeral 28 and the ground engaging area of the rib 20 is shown by the line X. The area of disengagement is shown by the reference numeral 29. The tire is provided with a carcass 30 illustrated as comprising four body plies of cord fabric and two plies of breaker stock. Accordingly, as the tire moves from left to right, as is shown in Fig. 3, the successive areas of the rubber in the rib 20 first are deflected in the area 28, and are then in ground engaging position until they are again deflected in the area 29 in the manner discussed in connection with the description of Fig. 6. This figure more clearly shows the more pronounced movement of the tread rubber in the breaking area 29 than in the engaging area 28. Because of the flexibility of the small segments on the rib 20 between adjacent slits 25, the several segments do not scuff or slip away from ground engagement but snap away when finally released as shown by the position of the element 31.

Suitable mathematical values for a 5.50–17 tire are given by way of illustration and not by way of limitation of the invention. The slits 26 may be spaced between $\tfrac{3}{16}$ to $\tfrac{5}{16}$ inch apart. The grooves between the ribs are about $\tfrac{11}{32}$ inch deep and the depths of the slots are about the same. Preferably, it is desirable, that the bottom of the slits shall be reached at the same time as the antiskid tread configuration grooves are worn out. To increase the depth of the slits beyond the depths of the grooves might bring the ends of the slits too close to the tire fabric. If the slits were not as deep as the grooves it would be necessary to increase the number of the slits in order to obtain equal flexibility so that the slits might have to be placed as close as $\tfrac{3}{32}$ of an inch. The width of the slits, for example, is that formed by a cutting or slicing instrument such as a knife.

The slits 26 of the intermediate ribs 21 and 22 are diagonally disposed in order to be in right angular relation to the tread movements in these portions of the tire. The depth and spacing of these slits are substantially the same as those of the slits 25 in the rib 20.

As the local movements of the rubber in the ribs 21 and 22 correspond to those in ribs 3 and 4 in Fig. 6 and are at right angles as between the engaging and breaking edges, it is only possible to position the slits crosswise of the local movement of the rubber in one area. As the greatest amount of movement takes place in the breaking area, I prefer that the inclination of the slits 26 be such that they are crosswise to the direction of the local movements in the breaking areas as shown in Fig. 1 with the tire rotating in the direction of the arrow A. This, of course, calls for the slits in the ribs 21 and 22 being at right angles to each other. The slits 27 in the ribs 23 and 24 extend substantially continuously circumferentially of the tire and have a spacing and depth corresponding to those of the slits 25.

Fig. 4 shows a transverse view at the centre of the ground contacting area, which is narrower than the normal width of the tread. As there is normally no substantial movement either longitudinally or laterally of the rubber at this section, the slits 26 and 27 of the intermediate and outer ribs are not separated. During the major portion of the ground contacting period the tread movements are slight and the rubber remains in a substantially stationary position relative to the road or ground. As the tread begins to break away from contact with the ground in the zone 29, the tread begins to increase to its normal width. In other words, the dimension Z in Fig. 5 begins to approach the normal tread width of the tire. This increase in width in the area 29 causes lateral movement of the ribs 21, 22, 23, and 24, which tends to produce an abrasive action against the ground. However, the presence of the slits 26 and 27, which are relatively crosswise to the local directions of movements of the rubber, separate the ribs into a number of tread elements of smaller dimensions. This prevents the transmission of strains in the ribs from one of the smaller tread elements to another. Consequently, each independent element in its relation with the ground will function independently and will adjust itself in relation to the ground and will eliminate excessive sliding and abrading, since the tread elements being more flexible tend to remain in engagement with the ground for a longer period.

Referring to Figs. 7 and 8, I have shown a modification of my invention in which a pneumatic tire 34 is provided with a central rib 35 and intermediate ribs 36 and 37 and shoulder ribs 38 and 39. The ribs may be given any suitable tread configuration or they may be plain, as desired. Arcuate slits or incisions are provided in the form of chords 40. The arcuate slits conform to the scheme of tread movements described in connection with Figs. 1 to 5. Across the central rib 35 the chords 40 extend substantially at right angles to the direction of the tread movement. Across the ribs 36 and 37 the chords form diagonal slits substantially at right angles to the movement of the rubber in the ribs. In the shoulder ribs 38 and 39 the chords sufficiently approach a direction circumferentially of the tire to relieve the strains in these ribs. The direction of rotation of this tire should preferably be that of the arrow B in Fig. 7.

A tire having a tread configuration such as is shown and described in connection with Figs. 1 to 5, inclusive, has shown an improvement of 68% in tread wear in a driving test in comparison to similar tires having no slits.

It is to be understood that the depth of the slits and the height of the tread elements have definite relation to tread wearing qualities and may be varied in different tire constructions in order to provide a suitable stability in the tread rubber. As the tread rubber wears down the stability of the rubber increases due to the lessened depths of the slits. The depths of the slits may be increased by re-cutting, if desired, depending upon the then condition of the tire.

A tire embodying my invention is characterized by interrupting the local directional movements of the tread rubber when engaging and disengaging the ground, thereby relieving continuous stresses in the tire. This is accomplished by interrupting the rubber by relatively closely spaced and parallel slits. The individual tread elements defined by the slits will flex more readily in proportion to the load and will result in greater uniformity in the distribution of the load over the ground contact area. The effect on the periphery of the tread when entering the ground contacting area is that each individual tread element defined by the slits is better adapted to adjust itself to the road surface by bending as distinguished from scuffing or wiping, than is possible with tread elements of the conventional types. Also, the smaller tread elements yield to grip the roadbed as the tire is leaving the road engaging area by reason of their flexing rather than incur a wiping action. Accordingly, the abrasion of the tire is materially reduced without sacrificing the antiskidding and other characteristics of the tire. It is to be understood that certain features of this invention are applicable to the solid or cushion tires.

While the invention has been shown and described with reference to tread configurations defined largely by parallel ribs and grooves the principles underlying the same are obviously applicable to any tread configuration including, without limiting the generality of the foregoing, those in which the traction or antiskid elements are wholly or partially separated from one another and regardless of the shape or form of the individual elements. All such as are within the principles underlying the invention are intended to be comprehended by the claims and references should be made thereto for understanding of the scope of the invention.

While I have shown and described certain preferred embodiments of my invention, by way of illustration of the invention, it is to be understood that the invention may be otherwise embodied in other arrangements and shapes of slits within the spirit of the invention and the scope of the appended claims.

Having thus described my invention what I claim and desire to protect by Letters Patent is:

1. A rubber tread for a pneumatic tire having its ground engaging surface interrupted by a plurality of slits, the slits at the centre of the tread being substantially cross-wise of the tread, those near the shoulders extending circumferentially of the tread and those in the intermediate areas having intermediate inclined directions cross-wise of the directions of certain of the movements in the rubber.

2. A pneumatic tire having a tread portion the ground engaging surface of which is interrupted by a plurality of slits, the slits at the centre of the tread being substantially cross-wise of the tread, those near the shoulders extending circumferentially of the tread and those in the intermediate areas having intermediate inclined directions cross-wise of the directions of the greater local movements in the rubber.

3. A pneumatic tire having a tread portion provided with an antiskid configuration, the antiskid configuration being interrupted by a plurality of slits, the slits at the centre of the tread being substantially cross-wise of the tread, those near the shoulders extending circumferentially of the tread and those in the intermediate areas having intermediate inclined directions cross-wise of the directions of the greater local movements in the rubber.

4. A pneumatic tire having a tread portion provided with an antiskid configuration comprising projections separated by grooves, the antiskid configuration being interrupted by a plurality of slits, the slits at the centre of the tread being substantially cross-wise of the tread, those near the shoulders extending circumferentially of the tread and those in the intermediate areas having intermediate inclined directions crosswise of the directions of certain of the movements in the rubber.

5. A pneumatic tire having a tread portion provided with an antiskid configuration comprising projections separated by grooves, the antiskid configuration being interrupted by a plurality of slits, the slits at the centre of the tread being substantially cross-wise of the tread, those near the shoulders extending circumferentially of the tread and those in the intermediate areas having intermediate inclined directions crosswise of the direction of the greater local movements in the rubber, the depth of the said slits being substantially the maximum depth of said configuration grooves.

6. A pneumatic tire having a rubber tread composed of a plurality of parallel and functionally continuous ribs of the same vulcanized rubber composition and similarly shaped in cross section, said ribs being defined by a plurality of circumferentially extending grooves of substantial width and depth, the majority at least of said ribs being provided with a plurality of slits extending more transversely than circumferentially but varying in their direction of extent in different ribs so as to be cross-wise to the direction of the greater part of the local movements of the rubber in the tread in contacting a road surface, the side walls defining each of said slits being substantially contiguous.

ARTHUR W. BULL.